(12) United States Patent
Sakitani et al.

(10) Patent No.: US 12,334,538 B2
(45) Date of Patent: Jun. 17, 2025

(54) NON-AQUEOUS ELECTROLYTE SECONDARY BATTERY

(71) Applicant: Panasonic Intellectual Property Management Co., Ltd., Osaka (JP)

(72) Inventors: Nobuhiro Sakitani, Tokushima (JP); Takaharu Morikawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1116 days.

(21) Appl. No.: 17/267,969

(22) PCT Filed: Aug. 1, 2019

(86) PCT No.: PCT/JP2019/030196
§ 371 (c)(1),
(2) Date: Feb. 11, 2021

(87) PCT Pub. No.: WO2020/044930
PCT Pub. Date: Mar. 5, 2020

(65) Prior Publication Data
US 2021/0218014 A1 Jul. 15, 2021

(30) Foreign Application Priority Data
Aug. 29, 2018 (JP) ................... 2018-159821

(51) Int. Cl.
*H01M 4/133* (2010.01)
*H01M 4/131* (2010.01)
(Continued)

(52) U.S. Cl.
CPC .......... *H01M 4/133* (2013.01); *H01M 4/131* (2013.01); *H01M 4/485* (2013.01); *H01M 10/0525* (2013.01); *H01M 10/0587* (2013.01); *H01M 2300/0017* (2013.01)

(58) Field of Classification Search
CPC ...... H01M 4/133; H01M 4/131; H01M 4/485; H01M 10/0525; H01M 10/0587; H01M 2300/0017
See application file for complete search history.

(56) References Cited

U.S. PATENT DOCUMENTS

| 5,677,082 A | 10/1997 | Greinke et al. |
| 2009/0123840 A1 | 5/2009 | Shirane et al. |
| 2017/0084910 A1* | 3/2017 | Ichikawa ............ H01M 4/625 |

FOREIGN PATENT DOCUMENTS

| EP | 3809492 A1 | 4/2021 |
| JP | 6-290774 A | 10/1994 |

(Continued)

OTHER PUBLICATIONS

EPO English Machine Translation of JP 2013140733, originally published to Kibune Motonari on Jul. 18, 2013 (Year: 2013).*

(Continued)

*Primary Examiner* — Niki Bakhtiari
*Assistant Examiner* — Niara Trant
(74) *Attorney, Agent, or Firm* — WHDA, LLP

(57) ABSTRACT

A nonaqueous electrolyte secondary battery according to an aspect of the present disclosure includes: an electrode body in which a positive electrode plate and a negative electrode plate are wound with a separator interposed therebetween; and an exterior package which receives the electrode body, the negative electrode plate includes a negative electrode collector, a first negative electrode mixture layer formed on a winding inside first surface of the negative electrode collector, and a second negative electrode mixture layer formed on a winding outside second surface of the negative electrode collector, the first negative electrode mixture layer contains first graphite particles as a primary component, the second negative electrode mixture layer contains second graphite particles as a primary component, and the first (Continued)

graphite particles has an internal void rate lower than an internal void rate of the second graphite particles.

3 Claims, 2 Drawing Sheets

(51) Int. Cl.
    *H01M 4/485*     (2010.01)
    *H01M 10/0525*     (2010.01)
    *H01M 10/0587*     (2010.01)

(56) References Cited

FOREIGN PATENT DOCUMENTS

| | | |
|---|---|---|
| JP | 9-320600 A | 12/1997 |
| JP | 2010-073618 A | 4/2010 |
| JP | 2011-165388 A | 8/2011 |
| JP | 2013-140733 A | 7/2013 |
| JP | 2014-067638 A | 4/2014 |
| JP | 2015185443 A * | 10/2015 |
| JP | 2017-050184 A | 3/2017 |
| KR | 20180125312 A * | 11/2018 |
| WO | 2007/074654 A1 | 7/2007 |

OTHER PUBLICATIONS

Google English Machine Translation of JP2015185443, originally published to Kato Akihiro on Oct. 22, 2015 (Year: 2015).*
EPO English Machine Translation of KR20180125312, originally published to Kim Hyuk Su on Nov. 23, 2018 (Year: 2018).*
The Extended European Search Report dated Dec. 9, 2021, issued in counterpart EP Application No. 19853539.5. (7 pages).
International Search Report dated Oct. 29, 2019, issued in counterpart International Application No. PCT/JP2019/030196 (2 pages).

* cited by examiner

NON-AQUEOUS ELECTROLYTE SECONDARY BATTERY

TECHNICAL FIELD

The present disclosure relates to a nonaqueous electrolyte secondary battery including a winding type electrode body.

BACKGROUND ART

As a negative electrode active material of a nonaqueous electrolyte secondary battery, a carbon material, such as graphite, has been primarily used. In order to improve a battery capacity and cycle characteristics of the nonaqueous electrolyte secondary battery, various carbon materials have been proposed.

PTL 1 has disclosed a nonaqueous electrolyte secondary battery which uses a carbon material having an internal void rate of 5% or less as a negative electrode active material.

PTL 2 has disclosed a nonaqueous electrolyte secondary battery which uses, as a negative electrode active material, a carbon material having an internal void rate of 1% to less than 23% and a carbon material having an internal void rate of 23% to 40%.

In order to prevent degradation of battery characteristics caused by expansion and contraction of a carbon material in charge/discharge, PTL 3 has disclosed a nonaqueous electrolyte secondary battery including an electrode body in which a negative electrode plate and a positive electrode plate are spirally wound with at least one separator interposed therebetween and in which a packing density of a negative electrode mixture layer at a winding inner surface side of the negative electrode plate is decreased lower than a packing density of a negative electrode mixture layer at a winding outer surface side of the negative electrode plate by 5% to 20%.

CITATION LIST

Patent Literature

PTL 1: Japanese Published Unexamined Patent Application No. 9-320600
PTL 2: Japanese Published Unexamined Patent Application No. 2014-67638
PTL 3: Japanese Published Unexamined Patent Application No. 6-290774

SUMMARY OF INVENTION

Technical Problem

In a nonaqueous electrolyte secondary battery having a spirally wound electrode body, a negative electrode plate is maintained in a curved state. A negative electrode mixture layer at a winding inner surface side of the negative electrode plate in the curved state is compressed to have a high packing density as compared to that in a flat state before winding. On the other hand, a negative electrode mixture layer at a winding outer surface side of the negative electrode plate in the curved state is stretched to have a low packing density as compared to that in the flat state. Hence, in the nonaqueous electrolyte secondary battery having a spirally wound electrode body, there has been a problem in that rates of degradation of the negative electrode mixture layers which form a front and a rear surface of the negative electrode plate in association with charge/discharge cycles are different from each other.

PTL 3 has proposed that the packing density of the negative electrode mixture layer at the winding inner surface side of the negative electrode plate is decreased lower than the packing density of the negative electrode mixture layer at the winding outer surface side of the negative electrode plate. However, as disclosed in PTL 3, when a carbon material concentration of a negative electrode mixture slurry is decreased so that the packing density of the negative electrode mixture layer at the winding inner surface side of the negative electrode plate is low, there has been a problem in that the contents of components, such as a binding agent, other than the carbon material are each unbalanced between the front and the rear surface sides of the negative electrode plate.

The present disclosure aims to provide a nonaqueous electrolyte secondary battery excellent in cycle characteristics.

Solution to Problem

A nonaqueous electrolyte secondary battery according to an aspect of the present disclosure comprises: an electrode body in which a positive electrode plate and a negative electrode plate are wound with a separator interposed therebetween; and an exterior package which receives the electrode body, the negative electrode plate includes a negative electrode collector, a first negative electrode mixture layer formed on a winding inside first surface of the negative electrode collector, and a second negative electrode mixture layer formed on a winding outside second surface of the negative electrode collector, the first negative electrode mixture layer contains first graphite particles as a primary component, the second negative electrode mixture layer contains second graphite particles as a primary component, and the first graphite particles has an internal void rate lower than an internal void rate of the second graphite particles.

Advantageous Effects of Invention

According to the aspect of the present disclosure, a nonaqueous electrolyte secondary battery which includes a spirally wound electrode body and which is excellent in cycle characteristics can be provided.

DESCRIPTION OF EMBODIMENT

Hereinafter, an embodiment of the present invention will be described in detail with reference to the drawings. In addition, the present invention is not limited to the following embodiment and may be carried out while being appropriately changed and/or modified within the scope of the present invention.

Figure 1:
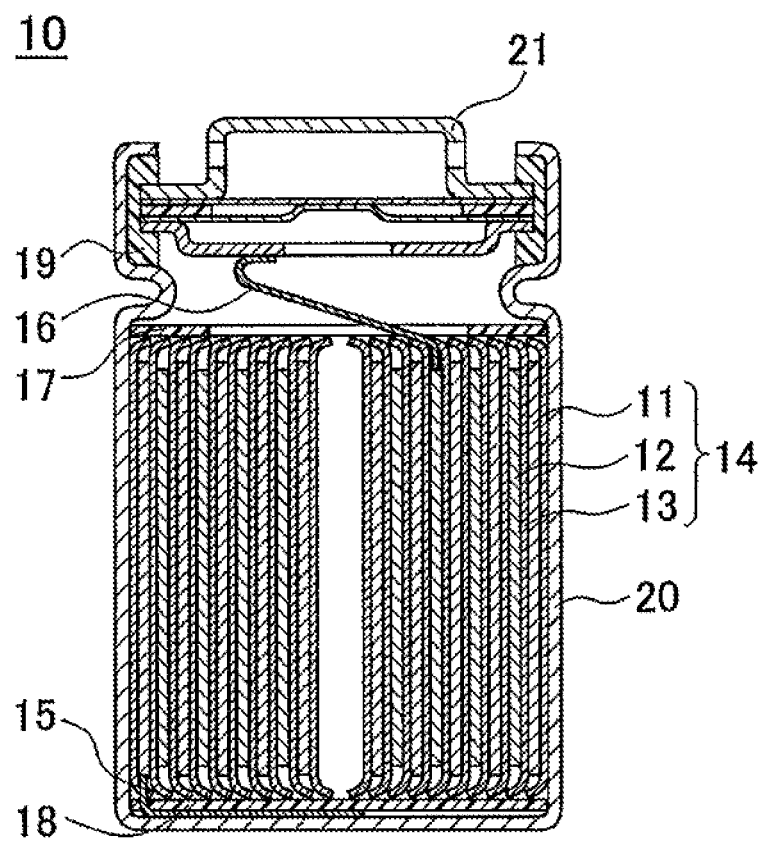
FIG. 1 is a cross-sectional view of a nonaqueous electrolyte secondary battery according to an embodiment.

FIG. 1 is a cross-sectional view of a nonaqueous electrolyte secondary battery 10 according to an embodiment of the present disclosure. An electrode body 14 is received in a bottom-closed cylindrical exterior package can 20 together with a nonaqueous electrolyte. Insulating plates 17 and 18 are provided at a top and a bottom of the electrode body 14, respectively. A sealing body 21 is caulking-fixed to an opening portion of the exterior package can 20 with an insulating gasket 19 interposed therebetween. Accordingly, the inside of the exterior package can 20 is tightly sealed.

The electrode body 14 is formed by spirally winding a negative electrode plate 11 and a positive electrode plate 12 with at least one separator 13 interposed therebetween. Along a radial direction of the electrode body 14, the negative electrode plate 11 and the positive electrode plate 12 are alternately laminated to each other. A negative electrode lead 15 and a positive electrode lead 16 are bonded to the negative electrode plate 11 and the positive electrode plate 12, respectively. A bottom portion of the exterior package can 20 is electrically connected to the negative electrode plate with the negative electrode lead 15 interposed therebetween, and the sealing body 21 is electrically connected to the positive electrode plate with the positive electrode lead 16 interposed therebetween. Accordingly, the exterior package can 20 functions as a negative electrode exterior terminal, and the sealing body 21 functions as a positive electrode exterior terminal. Although the cylindrical electrode body 14 is used in the embodiment of the present disclosure, a flat electrode body may also be used. When a flat electrode body is used, as an exterior package which receives the electrode body, a bottom-closed square exterior package can or a pouch exterior package formed from a laminate sheet in which a resin sheet and a metal sheet are laminated to each other may be used.

Figure 2:
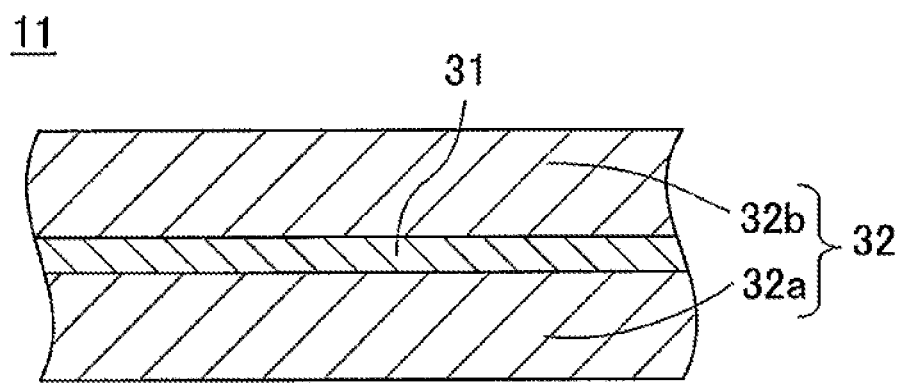
FIG. 2 is a partial cross-sectional view of a negative electrode plate according to the embodiment, the plate being placed in a flat state before winding.
Figure 3:
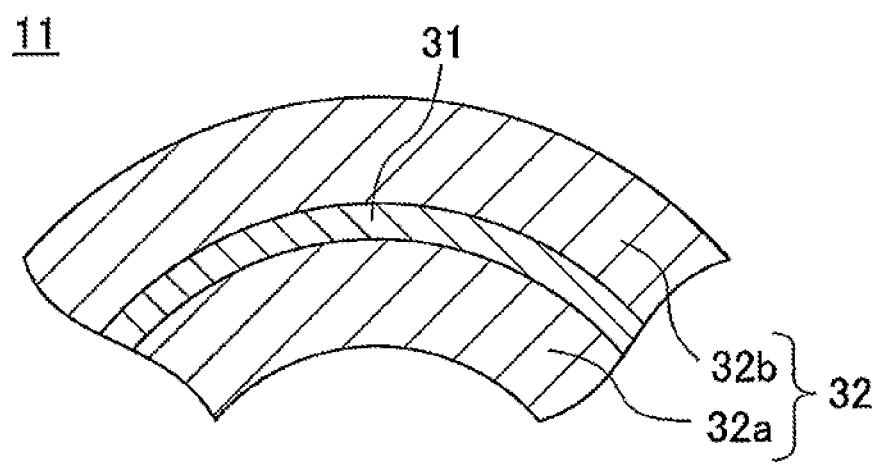
FIG. 3 is a partial cross-sectional view of the negative electrode plate according to the embodiment, the plate being placed in a curved state after winding.

FIG. 2 is a partial cross-sectional view of the negative electrode plate 11 according to the embodiment of the present disclosure, the plate being placed in a flat state before winding, and FIG. 3 is a partial cross-sectional view of the negative electrode plate 11 according to the embodiment of the present disclosure, the plate being placed in a curved state after winding. The negative electrode plate 11 includes a negative electrode collector 31 and negative electrode mixture layers 32 formed on two facing surfaces of the negative electrode collector 31. The negative electrode mixture layers 32 are a first negative electrode mixture layer 32a formed on a winding inside first surface of the negative electrode collector 31 and a second negative electrode mixture layer 32b formed on a winding outside second surface of the negative electrode collector 31.

The negative electrode mixture layer 32 can be formed such that a negative electrode mixture slurry formed by kneading a negative electrode active material and a binding agent in a dispersion medium is applied on the negative electrode collector 31 and is then dried. The negative electrode mixture layer 32 thus dried is compressed to have a predetermined thickness by a roller machine. To the negative electrode mixture slurry, a thickening agent is preferably added for viscosity adjustment.

Figure 4:
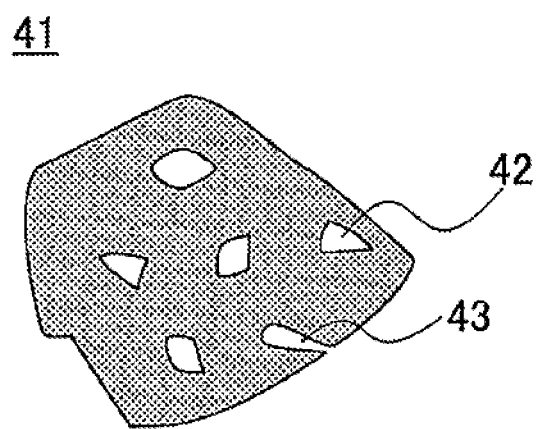
FIG. 4 is a cross-sectional view of a graphite particle.

The negative electrode mixture layer 32 contains graphite particles as the negative electrode active material. FIG. 4 schematically shows one example of a cross-section of a graphite particle 41. As shown in FIG. 4, in the cross-section of the graphite particle 41, internal voids 42 which are regions enclosed in the graphite particle 41 and an external void 43 extending from the inside to the surface of the particle are present. According to the embodiment of the present disclosure, at least two types of graphite particles having different internal void rates are each used as the negative electrode active material. First graphite particles having a lower internal void rate are contained in the first negative electrode mixture layer 32a as a primary component. Second graphite particles having a higher internal void rate are contained in the second negative electrode mixture layer 32b as a primary component. The internal void rate of the graphite particle 41 is a rate of areas of the internal voids 42 of the graphite particle 41 with respect to a cross-sectional area of the graphite particle 41. The primary component of the negative electrode mixture layer indicates a component having the highest mass ratio among components forming the negative electrode mixture layer.

(Measurement Method of Internal Void Rate)

Hereinafter, one example of a procedure of a measurement method of the internal void rate will be described.

(1) In order to expose cross-sections of the graphite particles, the negative electrode plate is partially cut off and then processed by an ion milling device (such as IM4000PLUS, manufactured by Hitachi Hi-Tech Corporation), so that a cross-section of the negative electrode mixture layer is exposed.

(2) By using a scanning electron microscope, a reflection electron image of the cross-section of the exposed negative electrode mixture layer is photographed. The magnification when the reflection electron image is photographed is 3,000 to 5,000 times.

(3) By using image analysis software (such as ImageJ, manufactured by National Institutes of Health), a binary processing is performed on the cross-sectional image of the negative electrode mixture layer thus photographed, so that a binary processing image in which cross-sectional sections of the graphite particles are each converted to a black color and void sections present in the graphite particles and therebetween are each converted to a white color is obtained.

(4) A graphite particle having a particle diameter of 5 to 50 μm is selected from the binary processing image, and a cross-sectional area of the selected graphite particle and areas of the internal voids thereof are calculated. The cross-sectional area of the graphite particle in the present disclosure indicates an area of a region surrounded by an outer circumference of the cross-section of the graphite particle, and the areas of the internal voids present in the region described above are included as a part of the cross-sectional area of the graphite particle. In addition, among the voids present in the cross-section of the graphite particle from the inside to the outer circumference thereof, a void having a width of 3 μm or less in the vicinity of the outer circumference is difficult to determine from the result of the image analysis whether this void is an internal void or an external void. In the case described above, the void having a width of 3 μm or less is assumed as the internal void. From the cross-sectional area of the graphite particle calculated from the cross-sectional image of the graphite particle and the areas of the internal voids of the cross-section of the graphite particle, the internal void rate is calculated based on the following equation. (internal void rate of graphite particle)=(areas of internal voids of cross-section of graphite particle)/(cross-sectional area of graphite particle)×100(%)

The internal void rate of the graphite particle may be evaluated, for example, based on an average value of internal void rates of 10 graphite particles.

When the electrode body 14 is formed, if the negative electrode plate 11 and the positive electrode plate 12 are spirally wound together with the separator 13, as shown in FIG. 3, the first negative electrode mixture layer 32a at a winding inner surface side of the negative electrode collector 31 is placed in a compressed state. On the other hand, the second negative electrode mixture layer 32b at a winding outer surface side of the negative electrode collector 31 is placed in a stretched state along a winding direction. Hence, the packing density of the first negative electrode mixture layer 32a becomes higher than the packing density of the second negative electrode mixture layer 32b, and hence, the difference in packing density of the negative electrode mixture layer 32 is generated between a front side and a rear side. If the packing density of the first negative electrode mixture layer 32a is excessively increased, for example, problems may arise in that the nonaqueous electrolyte is difficult to retain by the first negative electrode mixture layer 32a, and by the expansion and the contraction of the negative electrode active material in association with charge/discharge, the first negative electrode mixture layer 32a is liable to be cracked.

The present inventors obtain a novel finding in that when the internal void rate of graphite particles forming a negative electrode mixture layer is decreased, the negative electrode mixture layer is not likely to be compressed. That is, in the case in which the negative electrode plate 11 is formed, when the negative electrode mixture layer 32 is compressed, or when the negative electrode plate 11 is wound so as to be curved, an effect in that the first negative electrode mixture layer 32a is not likely to be compressed as compared to the second negative electrode mixture layer 32b can be obtained. Hence, according to the embodiment of the present disclosure, even when a winding type electrode body is used in a nonaqueous electrolyte secondary battery, the difference in packing density between the front and the rear sides of the negative electrode mixture layer 32 is not likely to be generated.

As the graphite particles, for example, a natural graphite or an artificial graphite may be used without being limited. However, since the internal void rate can be easily adjusted in a wide range, an artificial graphite is preferably used. Although being not particularly limited, the interplanar spacing ($d_{002}$) of the (002) plane of graphite particles by an X-ray diffraction method is preferably 0.3354 nm or more and more preferably 0.3357 nm or more. In addition, the interplanar spacing ($d_{002}$) of the (002) plane of graphite particles is preferably 0.34 nm or less. When graphite particles having an interplanar spacing (door) of the (002) plane in the range described above are used as the negative electrode active material, a nonaqueous electrolyte secondary battery excellent in battery characteristics, such as cycle characteristics, can be provided.

Hereinafter, an adjustment method of the internal void rate of graphite particles will be described using an artificial graphite as an example. First, a coke which is a precursor of an artificial graphite is pulverized to have a predetermined size. Subsequently, pulverized coke particles are aggregated by a binding agent and then pressure-molded to have a block shape. This block-shaped molded body is graphitized by firing at a temperature of 2,600° C. or more. Finally, the graphitized block-shaped molded body is pulverized and sieved to have a predetermined particle size, so that graphite particles are obtained. The internal void rate of the graphite particles can be adjusted by a volatile component contained in the block-shaped molded body. When the binding agent added to the coke particles is partially evaporated in the firing, the binding agent may also be used as the volatile component. As the binding agent described above, a pitch may be mentioned as one example.

The method for manufacturing graphite particles described above is suitable when graphite particles having a high internal void rate are manufactured. On the other hand, when graphite particles having a low internal void rate is manufactured, the following manufacturing method is preferable.

First, a coke which is a precursor of an artificial graphite is pulverized to have a predetermined size. Subsequently, pulverized coke particles are aggregated by a binding agent and then graphitized by firing at a temperature of 2,600° C. or more. The graphitized aggregate is crushed and sieved to have a predetermined particle size, so that graphite particles are obtained. As described above, since the pulverized coke is graphitized without being molded into a block shape, graphite particles having a low internal void rate can be obtained. The method for manufacturing graphite particles described above is particularly suitable for manufacturing of graphite particles having an internal void rate of 5% or less. The internal void rate of the graphite particles may be adjusted, for example, by an average particle diameter of the coke after pulverization. In addition, as the average particle diameter of the graphite or the coke, in the present disclosure, a volume-basis median diameter (D50) is used.

As the negative electrode active material, the negative electrode mixture layer 32 may contain, besides the graphite particles, another material capable of reversibly occluding and releasing lithium ions. For example, silicon material particles composed of silicon, an alloy containing silicon, an oxide containing silicon, or the like may be mentioned. Since having a large charge/discharge capacity per unit mass, the silicon material particles are suitably used for an increase in capacity of a nonaqueous electrolyte secondary battery. An effect of improving cycle characteristics of the present disclosure can be significantly obtained when a silicon material having a large volume change in charge/discharge is used. As the silicon material, a silicon oxide represented by $SiO_x$ ($0.55 \le x < 1.6$) or a composite material represented by $Li_{2z}SiO_{(2+z)}$ ($0 < z < 2$) in which silicon particles are dispersed in a lithium silicate phase is preferable. As the negative electrode active material, when the silicon material particles are used together with the graphite particles, the content of the silicon material particles in the negative electrode mixture layer with respect to the total mass of the graphite particles and the silicon material particles is preferably 2 to 10 percent by mass and more preferably 5 to 10 percent by mass.

The positive electrode plate 12 includes a positive electrode collector and positive electrode mixture layers formed on two facing surfaces of the positive electrode collector. The positive mixture layer can be formed by applying a positive electrode mixture slurry formed by kneading a positive electrode active material and a binding agent in a dispersion medium to the positive electrode collector, followed by drying. The positive electrode mixture layer thus dried is compressed by a roller machine to have a predetermined thickness. To the positive electrode mixture slurry, an electrically conductive agent, such as a carbon powder, is preferably added.

As the positive electrode active material, a lithium transition metal composite oxide capable of reversibly occluding and releasing lithium ions may be used. As the lithium transition metal composite oxide, a general formula of $LiMO_2$ (M indicates at least one of Co, Ni, and Mn), $LiMn_2O_4$, or $LiFePO_4$ may be mentioned. Those composite oxides may be used alone, or at least two types thereof may be used by mixing. A mixture obtained by adding at least one selected from the group consisting of Al, Ti, Mg, and Zr to the lithium transition metal composite oxide or a compound obtained by substituting a transition metal element of the lithium transition metal composite oxide by the element mentioned above may also be used. To particle surfaces of the lithium transition metal composite oxide, for example, oxide particles of Al, Zr, and/or Er may also be fixed.

As the separator 13, a fine porous film containing a polyolefin, such as a polyethylene (PE) or a polypropylene (PP), as a primary component may be used. As the fine porous film, one layer may only be used, or at least two layers laminated to each other may also be used. In a laminate separator having at least three layers, a layer containing a polyethylene (PE) having a low melting point as a primary component is preferably used as an intermediate layer, and a polypropylene (PP) having an excellent oxidation resistance is preferably used as a surface layer. To the separator, inorganic particles composed of, for example, aluminum oxide ($Al_2O_3$), titanium oxide ($TiO_2$), or silicon oxide ($SiO_2$) may be added. The inorganic particles mentioned above may be supported in the separator or may be applied to the surface of the separator with a binding agent. An aramid-based resin may be applied to the surface of the separator. In the case described above, the inorganic particles mentioned above are preferably added to the aramid-based resin.

As the nonaqueous electrolyte, an electrolyte in which a lithium salt functioning as an electrolyte salt is dissolved in a nonaqueous solvent may be used. A nonaqueous electrolyte in which a gel polymer is used instead of a nonaqueous solvent or in combination therewith may also be used.

As the nonaqueous solvent, a cyclic carbonate ester, a chain carbonate ester, a cyclic carboxylic acid ester, or a chain carboxylic acid ester may be used, and at least two types thereof are preferably used by mixing. As the cyclic carbonate ester, for example, ethylene carbonate (EC), propylene carbonate (PC), or butylene carbonate (BC) may be mentioned. In addition, as a fluoroethylene carbonate (FEC), a cyclic carbonate ester in which at least one hydrogen atom is substituted by fluorine may also be used. As the chain carbonate ester, for example, dimethyl carbonate (DMC), ethyl methyl carbonate (EMC), diethyl carbonate (DEC), or methyl propyl carbonate (MPC) may be mentioned. As the cyclic carboxylic acid ester, for example, γ-butyrolactone (γ-BL) or γ-valerolactone (γ-VL) may be mentioned, and as the chain carboxylic acid ester, for example, methyl pivalate, ethyl pivalate, methyl isobutyrate, or methyl propionate may be mentioned.

As the lithium salt, for example, $LiPF_6$, $LiBF_4$, $LiCF_3SO_3$, $LiN(CF_3SO_2)_2$, $LiN(C_2F_5SO_3)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, or $Li_2B_{12}Cl_{12}$ may be mentioned. Among those mentioned above, $LiPF_6$ is particularly preferable, and the concentration in the nonaqueous electrolyte is preferably 0.5 to 2.0 mol/L. Another lithium salt, such as $LiBF_4$, may also be mixed with $LiPF_6$.

Hereinafter, the embodiment of the present invention will be described in more detail with reference to experimental examples. In the experimental examples, the cylindrical nonaqueous electrolyte secondary battery according to the embodiment of the present disclosure was used, and the negative electrode active material was appropriately changed.

Experimental Example 1

(Formation of Graphite Particles A)

Graphite particles A used for a first negative electrode mixture layer at a winding inner surface side of a negative electrode collector were formed as described below. First, after a coke which was a precursor of graphite was pulverized to have an average particle diameter of 15 μm, a pitch functioning as a binding agent was added to the pulverized coke, and the coke was aggregated to have an average particle diameter of 17 μm. After being graphitized by firing at a temperature of 2,800° C., the aggregate thus obtained was classified using a 250-mesh sieve, so that graphite particles A having an average particle diameter of 23 μm and an internal void rate of 1% were obtained.

(Formation of Negative Electrode Mixture Slurry A)

The graphite particles A, a carboxymethyl cellulose (CMC), and a styrene-butadiene rubber (SBR) were used as a negative electrode active material, a thickening agent, and a binding agent, respectively. After 100 parts by mass of the graphite particles A, 1 part by mass of the CMC, and 1 part by mass of the SBR were mixed together, and a mixture thereof was kneaded in purified water functioning as a dispersion medium, so that a negative electrode mixture slurry A was formed.

(Formation of Graphite Particles B)

Graphite particles B used for a second negative electrode mixture layer at a winding outer surface side of the negative electrode collector were formed as described below. First, after a coke which was a precursor of graphite was pulverized to have an average particle diameter of 15 μm, a pitch functioning as a binding agent was added to the pulverized coke, and the coke was aggregated. An isotropic pressure was applied to the aggregate to form a block-shaped molded body having a density of 1.6 to 1.9 g/cm³. After being graphitized by firing at a temperature of 2,800° C., the block-shaped molded body thus obtained was pulverized and then classified using a 250-mesh sieve, so that graphite particles B having an average particle diameter of 23 μm and an internal void rate of 8% were obtained.

(Formation of Negative Electrode Mixture Slurry B)

The graphite particles B, a CMC, and an SBR were used as a negative electrode active material, a thickening agent, and a binding agent, respectively. After 100 parts by mass of the graphite particles B, 1 part by mass of the CMC, and 1 part by mass of the SBR were mixed together, and a mixture thereof was kneaded in purified water functioning as a dispersion medium, so that a negative electrode mixture slurry B was formed.

(Formation of Negative Electrode Plate)

The negative electrode mixture slurry A was applied to a winding inside first surface of a negative electrode collector formed from copper foil having a thickness of 8 μm. Next, the negative electrode mixture slurry B was applied to a winding outside second surface of the negative electrode collector. The negative electrode mixture slurry A and the negative electrode mixture slurry B applied to the negative electrode collector were dried to form a first negative electrode mixture layer and a second negative electrode mixture layer on the first surface and the second surface, respectively, of the negative electrode collector. The first and the second negative electrode mixture layers were compressed by a roller machine to have predetermined thicknesses, and an electrode plate thus compressed was cut to have predetermined dimensions, so that a negative electrode plate was formed. At a winding finish-side end portion of the negative electrode plate, negative electrode collector exposed portions at which the first and the second negative electrode mixture layers were not formed were provided, and a negative electrode lead formed from a nickel plate was bonded to the negative electrode collector exposed portions. The graphite particles A and the graphite particles B in Experimental Example 1 correspond to the first graphite particles and the second graphite particles of the present disclosure, respectively.

(Formation of Positive Electrode Plate)

As a positive electrode active material, lithium nickelate ($LiNi_{0.88}CO_{0.09}Al_{0.03}$) containing aluminum and cobalt was used. After 100 parts by mass of the positive electrode active material, 1 part by mass of a carbon black functioning as an electrically conductive agent, and 1 part by mass of a poly(vinylidene fluoride) (PVdF) functioning as a binding agent were mixed together, a mixture thereof was kneaded in N-methyl-2-pyrrolidone (NMP) functioning as a dispersion medium, so that a positive electrode mixture slurry was formed. The positive electrode mixture slurry thus formed was applied by a doctor blade method on two facing surfaces of a positive electrode collector formed from aluminum foil (thickness: 15 μm), followed by drying, so that positive electrode mixture layers were formed, After the positive electrode mixture layers thus formed were compressed by a roller machine to have predetermined thicknesses, an electrode plate thus compressed was cut to have predetermined dimensions, so that a positive electrode plate was formed. At an intermediate portion of the positive electrode plate in a longitudinal direction, positive electrode collector exposed portions at which no positive electrode mixture layers were formed on the two facing surfaces of the positive electrode collector were provided, and a positive electrode lead formed from an aluminum plate was bonded to the positive electrode collector exposed portion.

(Formation of Electrode Body)

The negative electrode plate and the positive electrode plate thus formed were spirally wound with separators each formed from a polyethylene-made fine porous film to form an electrode body. In this case, the first negative electrode mixture layer and the second negative electrode mixture layer were disposed at a winding inside and a winding outside, respectively, of the electrode body.

(Preparation of Nonaqueous Electrolyte)

Ethylene carbonate (EC) and dimethyl carbonate (DMC) were mixed together at a volume ratio of 1:3, so that a nonaqueous solvent was prepared. After 5 parts by mass of vinylene carbonate (VC) was added to 100 parts by mass of this nonaqueous solvent, lithium hexafluorophosphate ($LiPF_6$) was dissolved therein to have a concentration of 1.5 mol/L, so that a nonaqueous electrolyte was prepared.

(Formation of Nonaqueous Electrolyte Secondary Battery)

Insulating plates were disposed at a top and a bottom of the electrode body, and the electrode body was received in an exterior package can. The negative electrode lead was bonded to a bottom portion of the exterior package can, and a groove portion was formed around a periphery of a side surface of an opening portion of the exterior package can by press working. After the positive electrode lead was bonded to an internal terminal plate of a sealing body, the nonaqueous electrolyte was charged in the exterior package can. Finally, the sealing body was caulking-fixed to the opening portion of the exterior package can with a gasket supported by the groove portion, so that a nonaqueous electrolyte secondary battery according to Experimental Example 1 was formed.

Experimental Example 2

Except for that the internal void rate of the graphite particles B was set to 15%, a nonaqueous electrolyte secondary battery according to Experimental Example 2 was formed in a manner similar to that of Experimental Example 1. The graphite particles B having an internal void rate of 15% were obtained by increasing the addition amount of the pitch larger than that in Experimental Example 1.

Experimental Example 3

Except for that the internal void rate of the graphite particles B was set to 20%, a nonaqueous electrolyte secondary battery according to Experimental Example 3 was formed in a manner similar to that of Experimental Example 1. The graphite particles B having an internal void rate of 20% were obtained by increasing the addition amount of the pitch larger than that in Experimental Example 2.

Experimental Example 4

Except for that the internal void rate of the graphite particles B was set to 259, a nonaqueous electrolyte secondary battery according to Experimental Example 4 was formed in a manner similar to that of Experimental Example 1. The graphite particles B having an internal void rate of 25% were obtained by increasing the addition amount of the pitch larger than that in Experimental Example 3.

Experimental Example 5

Except for that the internal void rate of the graphite particles A was set to 5%, a nonaqueous electrolyte secondary battery according to Experimental Example 5 was formed in a manner similar to that of Experimental Example 1. The graphite particles A having an internal void rate of 5% were obtained such that the average particle diameter of the pulverized coke particles functioning as a precursor of the graphite particles was set to 10 μm.

Experimental Example 6

Except for that the internal void rate of the graphite particles B was set to 15%, a nonaqueous electrolyte secondary battery according to Experimental Example 6 was formed in a manner similar to that of Experimental Example 5.

Experimental Example 7

Except for that the internal void rate of the graphite particles B was set to 208, a nonaqueous electrolyte secondary battery according to Experimental Example 7 was formed in a manner similar to that of Experimental Example 5.

Experimental Example 8

Except for that the internal void rate of the graphite particles B was set to 25%, a nonaqueous electrolyte secondary battery according to Experimental Example 8 was formed in a manner similar to that of Experimental Example 5.

Experimental Example 9

Except for that the internal void rate of the graphite particles A was set to 8%, a nonaqueous electrolyte secondary battery according to Experimental Example 9 was formed in a manner similar to that of Experimental Example 2.

Experimental Example 10

Except for that silicon oxide (SiO) particles functioning as the negative electrode active material were added to the first negative electrode mixture layer and the second negative electrode mixture layer, a nonaqueous electrolyte secondary battery according to Experimental Example 10 was formed in a manner similar to that of Experimental Example 6. The contents of the SiO particles of the first negative electrode mixture layer and the second negative electrode mixture layer were each set to 2 percent by mass with respect to the total mass of the graphite particles and the SiO particles.

Experimental Example 11

Except for that the internal void rate of the graphite particles B was set to 58, a nonaqueous electrolyte secondary battery according to Experimental Example 11 was formed in a manner similar to that of Experimental Example 10.

Experimental Example 12

Except for that the internal void rate of the graphite particles A was set to 15%, a nonaqueous electrolyte secondary battery according to Experimental Example 12 was formed in a manner similar to that of Experimental Example 10.

Experimental Example 13

Except for that the contents of the SiO particles of the first negative electrode mixture layer and the second negative electrode mixture layer were each set to 5 percent by mass, a nonaqueous electrolyte secondary battery according to Experimental Example 13 was formed in a manner similar to that of Experimental Example 10.

Experimental Example 14

Except for that the internal void rate of the graphite particles B was set to 5%, a nonaqueous electrolyte secondary battery according to Experimental Example 14 was formed in a manner similar to that of Experimental Example 13.

Experimental Example 15

Except for that the internal void rate of the graphite particles A was set to 158, a nonaqueous electrolyte secondary battery according to Experimental Example 15 was formed in a manner similar to that of Experimental Example 13.

Experimental Example 16

Except for that the contents of the SiO particles of the first negative electrode mixture layer and the second negative electrode mixture layer were each set to 10 percent by mass, a nonaqueous electrolyte secondary battery according to Experimental Example 16 was formed in a manner similar to that of Experimental Example 10.

Experimental Example 17

Except for that the internal void rate of the graphite particles B was set to 58, a nonaqueous electrolyte secondary battery according to Experimental Example 17 was formed in a manner similar to that of Experimental Example 16.

Experimental Example 18

Except for that the internal void rate of the graphite particles A was set to 15%, a nonaqueous electrolyte secondary battery according to Experimental Example 18 was formed in a manner similar to that of Experimental Example 16.

Experimental Example 19

Except for that the contents of the SiO particles of the first negative electrode mixture layer and the second negative electrode mixture layer were each set to 15 percent by mass, a nonaqueous electrolyte secondary battery according to Experimental Example 19 was formed in a manner similar to that of Experimental Example 10.

Experimental Example 20

Except for that the internal void rate of the graphite particles B was set to 58, a nonaqueous electrolyte secondary battery according to Experimental Example 20 was formed in a manner similar to that of Experimental Example 19.

Experimental Example 21

Except for that the internal void rate of the graphite particles A was set to 15%, a nonaqueous electrolyte secondary battery according to Experimental Example 21 was formed in a manner similar to that of Experimental Example 19.

(Evaluation of Cycle Characteristics)

The batteries of the experimental examples were each charged at a constant current of 0.3 It (=900 mA) to a battery voltage of 4.2 V and then charged at a constant voltage of 4.2 V to a current of 0.05 It (=150 mA). Subsequently, the batteries of the examples were each discharged at a constant current of 0.3 It to a battery voltage of 2.75 V. This charge/discharge cycle was repeatedly performed 1,000 cycles in an environment at 25° C. A rate (%) of a discharge capacity at a $1,000^{th}$ cycle to the discharge capacity at the first cycle was calculated as a capacity retention rate, and the cycle characteristics were evaluated thereby. The results are shown in Table 1.

TABLE 1

| | INTERNAL VOID RATE | | | |
|---|---|---|---|---|
| | GRAPHITE PARTICLES A (WINDING INSIDE) | GRAPHITE PARTICLES B (WINDING OUTSIDE) | CONTENT OF SiO PARTICLES | CYCLE CHARACTERISTICS |
| EXAMPLE 1 | 1% | 8% | 0% | 82% |
| EXAMPLE 2 | 1% | 15% | 0% | 81% |
| EXAMPLE 3 | 1% | 20% | 0% | 81% |
| EXAMPLE 4 | 1% | 25% | 0% | 74% |
| EXAMPLE 5 | 5% | 8% | 0% | 84% |
| EXAMPLE 6 | 5% | 15% | 0% | 82% |
| EXAMPLE 7 | 5% | 20% | 0% | 83% |
| EXAMPLE 8 | 5% | 25% | 0% | 73% |
| EXAMPLE 9 | 8% | 15% | 0% | 76% |
| EXAMPLE 10 | 5% | 15% | 2% | 80% |
| EXAMPLE 11 | 5% | 5% | 2% | 69% |
| EXAMPLE 12 | 15% | 15% | 2% | 68% |
| EXAMPLE 13 | 5% | 15% | 5% | 71% |
| EXAMPLE 14 | 5% | 5% | 5% | 59% |
| EXAMPLE 15 | 15% | 15% | 5% | 58% |
| EXAMPLE 16 | 5% | 15% | 10% | 55% |
| EXAMPLE 17 | 5% | 5% | 10% | 41% |
| EXAMPLE 18 | 15% | 15% | 10% | 42% |
| EXAMPLE 19 | 5% | 15% | 15% | 32% |
| EXAMPLE 20 | 5% | 5% | 15% | 29% |
| EXAMPLE 21 | 15% | 15% | 15% | 27% |

The results of the cycle characteristics of Experimental Examples 10 to 21 in Table 1 show that when the internal void rate of the graphite particles A contained in the winding inside first negative electrode mixture layer of the negative electrode plate is set lower than the internal void rate of the graphite particles B contained in the winding outside second negative electrode mixture layer of the negative electrode plate, the cycle characteristics are improved. For example, when the cycle characteristics of Experimental Examples 10 to 12 in each of which the content of the SiO particles is 2 percent by mass are compared to each other, it is found that compared to Experimental Examples 11 and 12 in which the graphite particles having the same internal void rate are used at the winding inside and the winding outside of the negative electrode plate, the cycle characteristics of Experimental Example 10 is improved by 11% to 12%. In particular, from the results of the cycle characteristics of Experimental Examples 10 to 21, it is found that the content of the SiO particles is more preferably 5 to 10 percent by mass. The contents of the SiO particles in the first negative electrode mixture layer and the second negative electrode mixture layer are not always required to be the same.

As shown in Experimental Examples 10 to 21, when the silicon material particles, such as the SiO particles, having a large volume change in charge/discharge are contained in the negative electrode active material layer, the effect of the present disclosure can be significantly obtained. However, since the graphite particles also have a volume change in charge/discharge, even in the case in which no silicon material particles are contained in the negative electrode mixture layer as in Experimental Examples 1 to 9, the effect of the present disclosure can also be obtained. The results of the cycle characteristics of Experimental Examples 1 to 9 show preferable ranges of the respective internal void rates of the graphite particles A and the graphite particles B. That is, the internal void rate of the graphite particles A is preferably 1% to 5%, and the internal void rate of the graphite particles B is preferably 8% to 20%.

REFERENCE SIGNS LIST 10 nonaqueous electrolyte secondary battery
11 negative electrode plate
12 positive electrode plate
13 separator
14 electrode body
15 negative electrode lead
16 positive electrode lead
17 insulating plate
18 insulating plate
19 gasket
20 exterior package can
21 sealing body
31 negative electrode collector
32 negative electrode mixture layer
32a first negative electrode mixture layer
32b second negative electrode mixture layer
41 graphite particles
42 internal void
43 external void

The invention claimed is:
1. A nonaqueous electrolyte secondary battery comprising: an electrode body in which a positive electrode plate and a negative electrode plate are wound with a separator interposed therebetween; and an exterior package which receives the electrode body,
wherein the negative electrode plate includes a negative electrode collector, a first negative electrode mixture layer formed on a winding inside first surface of the negative electrode collector, and a second negative electrode mixture layer formed on a winding outside second surface of the negative electrode collector,
the first negative electrode mixture layer contains first graphite particles as a primary component,
the second negative electrode mixture layer contains second graphite particles as a primary component, and the first graphite particles has an internal void rate lower than an internal void rate of the second graphite particles, wherein the internal void rate represents an average ratio of internal voids to a graphite particle, the internal voids being enclosed within, and apart from a perimeter of, the graphite particle, wherein the internal void rate is calculated based on the following equation: (internal void rate of graphite particle)=(areas of internal voids of cross-section of graphite particle)/(cross-sectional area of graphite particle)×100(%), wherein the internal void rate of the first graphite particles is 5% or less, and the internal void rate of the second graphite particles is 8% to 20%.

2. The nonaqueous electrolyte secondary battery according to claim 1, wherein the first negative electrode mixture layer contains first silicon material particles containing silicon, and a content of the first silicon material particles is 2 to 10 percent by mass with respect to the total mass of the first graphite particles and the first silicon material particles, and the second negative electrode mixture layer contains second silicon material particles containing silicon, and a content of the second silicon material particles is 2 to 10 percent by mass with respect to the total mass of the second graphite particles and the second silicon material particles.

3. The nonaqueous electrolyte secondary battery according to claim 2, wherein the first silicon material particles and the second silicon material particles each include at least one selected from silicon oxide particles represented by a general formula of $SiO_x$ wherein $0.5 \leq x < 1.6$, and lithium silicate-silicon composite particles represented by a general formula of $Li_{2z}SiO_{(2+z)}$ wherein $0 < z < 2$, in which silicon phases are dispersed in a lithium silicate phase.

* * * * *